Jan. 27, 1948. F. A. WAGNER 2,435,110
HYDROSTATIC FEED
Original Filed Jan. 12, 1937
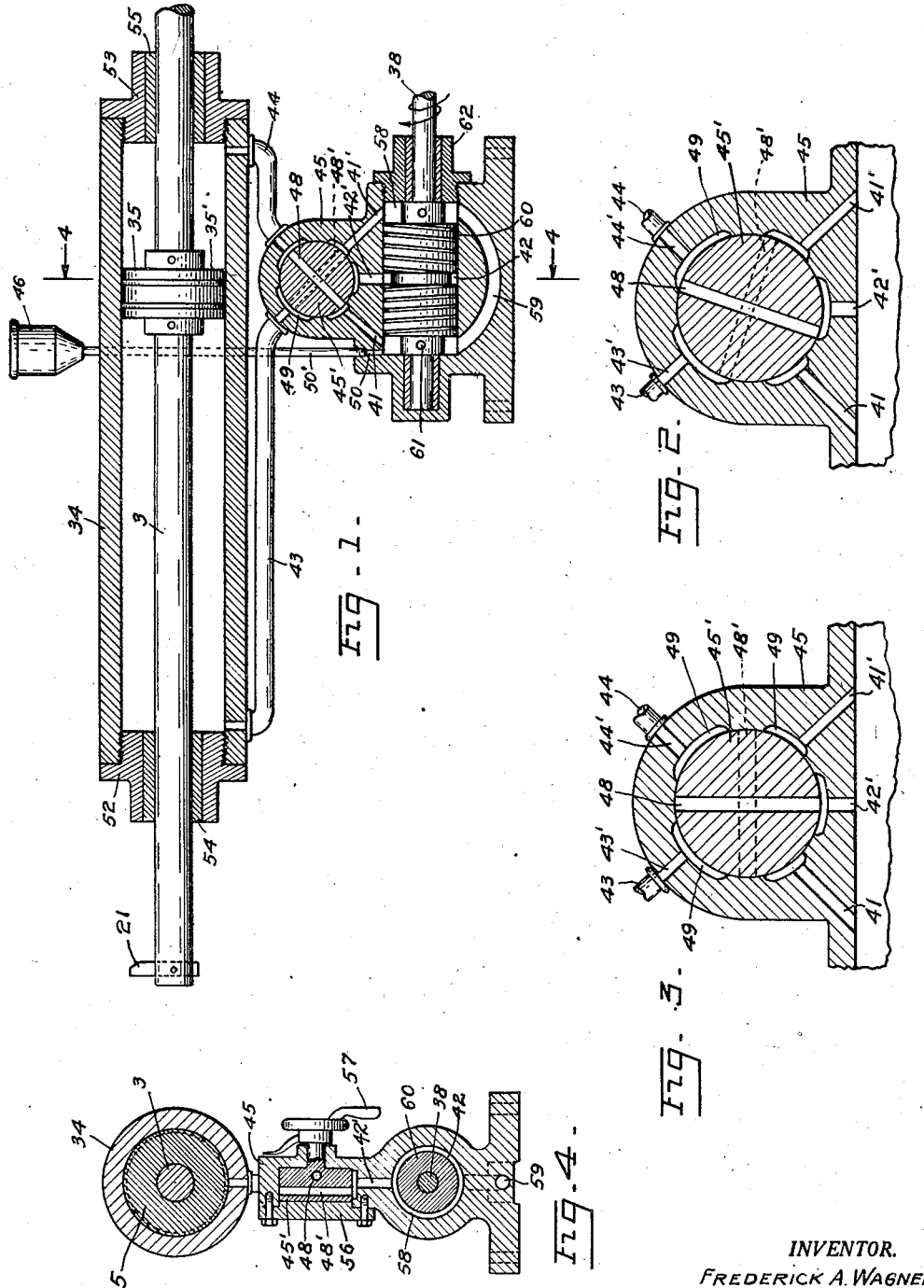
INVENTOR.
FREDERICK A. WAGNER
BY
ATTORNEY Patented Jan. 27, 1948

2,435,110

UNITED STATES PATENT OFFICE 2,435,110

HYDROSTATIC FEED

Frederick A. Wagner, Oakland, Calif.

Original application January 12, 1937, Serial No. 120,245, now Patent No. 2,152,293, dated March 28, 1939. Divided and this application February 13, 1939, Serial No. 256,091

3 Claims. (Cl. 60—52)

This invention relates to hydrostatic or hydraulic feed apparatus of the type disclosed in my copending patent application filed under Serial No. 120,245 on January 12, 1937 (now Patent No. 2,152,293), and constitutes a divisional application thereof drawn to cover the modification of the invention shown in Figure 5 of said copending application.

The object of the present invention is to provide a simple, effective, hydraulically operated power cylinder or plunger feed bar of more general application than the one claimed in my copending application. Particular features and advantages of the invention will appear in the following description and accompanying drawings.

In the drawings:

Figure 1 is a longitudinal section of the apparatus.

Figure 2 is an enlarged detached sectional view of the controlling valve of Figure 1.

Figure 3 is a view similar to that of Figure 2 but with the valve turned to "off" position.

Figure 4 is a sectional view of Figure 1 taken along the line 4—4 thereof.

Briefly described the present invention relates to the special combination of a longitudinally movable plunger or piston work bar, or feed bar, operating in a cylinder, with a spirally grooved oil pumping rotor operating on the viscosity principle only, controlled by a multiple valve so as to control the flow of oil (or other viscous liquid) under pressure to either end of the work-bar piston, or by-pass the oil from one end of the piston to the other, or shut the oil off entirely from the piston to lock the work or feed bar in any position. Other advantages of the construction will appear in the more complete description to follow:

In more detail the drawings show a work or feed bar 3 slidably mounted in a power cylinder 34, and firmly secured to the bar 3 is a piston 35 preferably of the sealing ring type and having any number of piston rings 35' fitting nicely within the cylinder 34.

The work bar 3 is preferably round and is slidably supported in heads 52, 53 secured in any desired manner to the ends of cylinder 34 and preferably fitted with close fitting bearing bushings 54—55 to permit the bar 3 to slide, yet provide an oil tight joint at each end of the cylinder. Optionally any kind of stuffing boxes may be used at these points, though with the viscous oil intended to be used in the apparatus it will not leak even without packing if made nicely. The work bar is here shown with a tool 21 at its outer end to constitute a boring bar, though it should be noted that the movement of the bar or plunger may be used to carry out any work for which it is adapted.

Cylinder 34 is rigidly mounted over or on the controlling valve housing 45 in which the controlling valve operates. The valve may take various forms but is here shown with a revolvable valve plug 45' smoothly mounted for rotation in the valve housing 45 and held in position by a cap 56, the valve plug being provided with a suitable handle 57 for turning the plug. The plug is formed with suitable ports 48, 48' which are laterally offset and extend independently through the plug to opposite points in the diameter, but both opening at their ends, when the plug is turned, to any of five recesses 49 formed in the bore of the valve housing.

The upper two of the recesses 49 are respectively connected to opposite ends of the cylinder 34 as by pipes 43, 44 and passages 43', 44', while two of the lower recesses communicate respectively by passages 41 and 41' to opposite ends of a short cylinder 58 formed in the valve housing beneath the plug, and which cylinder is also connected from end to end by a by-pass passage 59 formed in the base of the valve housing.

Within the short cylinder 58 is a nicely fitting cylindrical rotor 60 formed with a central peripheral channel 42 in register with a passageway 42' in the valve housing connected with the lowermost of the recesses 49, and at opposite sides of channel 42 the rotor is formed respectively with a very shallow right and left hand spiral groove, so as to force oil from opposite ends of the rotor cylinder into channel 42 and out of passage 42' as the rotor is revolved.

The rotor is blocked against endwise movement in its cylinder, and it may be formed integral with an operating shaft 38 or may be secured thereto as by pins 61 passing through the ends of the rotor which are of somewhat reduced diameter to provide an annular space about each end of the rotor open to by-pass passage 59 and to valve passages 41, 41' as indicated.

The shaft 38 of the rotor fits nicely in bearings formed at opposite ends of the rotor cylinder 58 here shown suitably bushed and with at least one bearing 62 either screwed in place or otherwise made detachable to facilitate assembling of the parts.

In operation, all of the passages, ports and cylinders are kept completely filled with oil, and at one end of the rotor cylinder is a vertically extending passageway 50 communicating with an upwardly extending pipe 50' which carries at its upper end an elevated oil cup or reservoir 46 and always open at its lower end to the intake ends of the rotor for insuring the automatic replenishing of any slight oil leakage from the apparatus in use.

With the valve plug turned to the position shown in Figure 1 the oil completely filling both ends of the power or feed cylinder 34, the oil is free to travel from either end to the other by way of pipes 43, 44 and the plug ports which are freely open through the valve housing passages to opposite ends of rotor cylinder 58 in turn openly connected by passage 59—so that it leaves the feed bar 3 free for sliding back and forth in its cylinder mounting.

With the valve plug turned to position of Figure 3 the plug ports are not open to pipes 43, 44 but are both closed off from the pipes so that the oil in the feed bar cylinder is blocked against movement and the feed bar is locked.

With the valve plug turned to position of Figure 2 the plug port 48 is open to pipe 44 and to the center of the rotor through passage 42', while the other plug port 48' is open to pipe 43 and to one end of the rotor cylinder and also to the other end by way of passage 59, so that if the rotor is turning in direction of the arrow oil will be drawn from both ends of the rotor cylinder and forced out of channel 42 through passage 42', port 48 and pipe 44 to the right hand end of cylinder 34 and force the feed bar to the left.

A glance at Figure 3 will make it plain that by rocking the plug either to the left or right port 48 may bring either end of the feed or power cylinder 34 into operation connection with the rotor oil outflow channel 42 while relieving the oil from the opposite end of the feed cylinder by way of the by-pass channel 59 as described for Figure 2. Also that by careful turning of the valve plug the ports 48—48' can be opened to any degree so as to control the amount of oil flowing through in both directions to and from the power cylinder, and thus control the speed of the bar.

The nature of the apparatus is such that when the valve plug 45' is turned to position of Figure 3 to close off any passage of oil through the plug, a continued turning of the rotor will do no harm, for when it builds up a pressure equal to its capacity it will simply revolve the oil in its spirals as a unit with the rotor.

The character of the spiral grooves in the rotor are very important for it must be distinctly understood that the rotor is not a screw pump as the term is generally understood, for if the spiral grooves were at all in the nature of a thread of any depth such as ⅛", ¼" or ½" in depth there would be no useful effect produced in the apparatus as no usable working pressure could be built up in the power cylinder, except perhaps at tremendous speeds of rotation which would be prohibitive. Whereas, as explained more fully in my copending application, with a rotor of about 2½" in diameter and with the spiral grooves very shallow—preferably between 8/1000" to 20/1000" and the oil used is machine oil of about an S. A. E. viscosity ranging from about 30 to 40, pressures of from 100 to 400 lbs. will be developed in a 2 or 3 inch power cylinder even with the rotor being turned as slow as one revolution per second, yet if the spiral groove were deep, no useful result could be produced.

The spiral grooves are preferably about an eighth of an inch wide and of double or triple lead and the form may be varied considerably from a true spiral as more fully set out in the copending application (Patent No. 2,152,293) and wherein modifications of the rotor are shown and its size and action and pressures developed, are more completely explained.

It will be evident from the above description that other types of multiple-way valves or a plurality of ordinary valves operatively connected together to produce the result described, may be used in place of the revolvable plug valve shown, as the type shown was selected also to make the drawing more easily understood.

It will also be evident that while I prefer to use a double opposed spiral rotor as it avoids any end pressure, and also maintains the low or suction pressure at both bearings so that a through driving shaft may be used without danger of forcing oil along the shaft to leak beyond the bearings, and thus also avoids the use of any packing boxes on the shaft bearings, yet the rotor may have only the right or left hand spiral portion, as either half of the rotor could be left blank, but the arrangement shown avoids all end thrust.

From the above explanation of the action of the rotor on a viscous oil, it will be evident that the proper grade and viscosity of the oil is important, the other liquids or solutions of similar viscosity to that of the oil set out may also be used, and are intended to be included in the term "oil" as used herein. However as thin oils such as kerosene, turpentine, also water, alcohol, gasoline, and other substantially non-viscous liquids will not operate at all in the apparatus nor will greases such as lubricating greases, operate in the apparatus to produce any useful result, it is apparent that the invention is not a mere substitution of a screw pump for other types of pumps used heretofore to operate a power cylinder, but as the special rotor operating with a viscous oil at once yields a simplicity of construction free from check valves, and permitting entire absence of packing boxes, and also giving any desired control of the plunger movements from slowest to full speed in either direction, or complete locking at any point of travel without changing the speed of the rotor, or locking the power cylinder automatically if the rotor should stop, and finally, of greatest importance for machine tool feed purposes it is the only arrangement known to me which of relatively small size and operated at slow speeds will produce a steady longitudinal motion of the work-bar entirely free from any pump pulsations whatever, and which are inherent in every type of pump ever applied to or which is at all practicable for operating such a feed or work bar, all features never combined before in any such a power cylinder without much more elaborate and costly apparatus, and its valve has been proven out by actual shop tools made and sold by me embodying this feature for some time in successful use, I feel entitled to broad coverage in bringing the elements together in the novel manner set out and covered in my appended claims, and for any purpose or use to which the combination can be applied.

I therefore claim:

1. A machine feed comprising in combination a hydraulic cylinder, a piston reciprocable in said cylinder and having a piston rod slidably extending from the cylinder and constituting a machine feed bar, a pump for supplying liquid under pressure to said cylinder, piping extending to and from the inlet and outlet of the pump to opposite ends of the cylinder, reversing valve means forming a part of and connected in said piping for controlling the flow of liquid to and from said pump and opposite ends of the cylinder for reciprocating the piston and feed bar, said pump comprising a closed housing with a cylindrical rotor rotatably fitting therein and having a shaft extended from the housing for rotating the rotor, said rotor having two groups of helical viscosity pump grooves, respectively right and left hand arranged in endwise relation freely open at their remote and adjacent ends respectively at all points in the revolution of the rotor to liquid inlet and outlet spaces within the pump housing constituting respectively said inlet and outlet of the pump, said spaces being large enough to always maintain the full flow area of the revolving ends of said grooves so that liquid pumped by rotating the rotor will flow continuously without pulsation from the inlet spaces to the outlet space, the helical grooves of the rotor being of a shallow depth adapted to operate on the viscosity principle with a viscous oil as the hydraulic liquid and incapable of building up any useful pressure with water for the purpose set out.

2. A machine feed comprising in combination a hydraulic cylinder, a piston reciprocable in said cylinder and having a piston rod slidably extending from the cylinder and constituting a machine feed bar, a pump for supplying liquid under pressure to said cylinder, piping extending to and from the inlet and outlet of the pump to opposite ends of the cylinder, reversing valve means forming a part of and connected in said piping for controlling the flow of liquid to and from said pump and opposite ends of the cylinder for reciprocating the piston and feed bar, said pump comprising a rotatable cylindrical rotor fitting within a closed housing and provided with a shaft extending from the housing for operating the rotor, said rotor having two groups of helical viscosity pump grooves, respectively right and left hand arranged in endwise relation freely open at their opposite ends respectively at all points of their revolution to inlet and outlet spaces within the pump housing constituting respectively said inlet and outlet of the pump, said spaces being large enough to always maintain the full flow area of the revolving ends of said grooves so that liquid pumped by rotating the rotor will flow continuously without pulsation from the inlet end space to the outlet end space, and a port freely open to and connecting the spaces at the remote ends of the rotor, the helical grooves of the rotor being of a shallow depth adapted to operate on the viscosity principle with a viscous oil as the hydraulic liquid and incapable of building up any useful pressure with water for the purpose set out.

3. A machine feed comprising in combination a hydraulic cylinder, a piston reciprocable in said cylinder and having a piston rod slidably extending from the cylinder and constituting a machine feed bar, a pump for supplying liquid under pressure to said cylinder, piping extending to and from the inlet and outlet of the pump to opposite ends of the cylinder, reversing valve means forming a part of and connected in said piping for controlling the flow of liquid to and from said pump and opposite ends of the cylinder for reciprocating the piston and feed bar, said pump comprising a rotatable cylindrical rotor fitting within a closed housing and provided with a shaft extending from the housing for operating the rotor, said rotor having a plurality of helical viscosity pump grooves freely open at opposite ends respectively to inlet and outlet spaces within the pump housing constituting respectively said inlet and outlet of the pump, said spaces being large enough to always maintain the full flow area of the revolving ends of said grooves so that liquid pumped by rotating the rotor will flow continuously without pulsation from the inlet space to the outlet space, the helical grooves of the rotor being of a shallow depth adapted to operate on the viscosity principle with a viscous oil as the hydraulic liquid and incapable of building up any useful pressure with water for the purpose set out.

FREDERICK A. WAGNER.

REFERENCES CITED

The following references are of record in the file of this patent:

UNITED STATES PATENTS

| Number | Name | Date |
| --- | --- | --- |
| 1,126,812 | McQueen | Feb. 2, 1915 |
| 1,134,048 | Isberg | Mar. 30, 1915 |
| 1,139,091 | Pratt | May 11, 1915 |
| 1,343,117 | Dana | June 8, 1920 |
| 1,395,001 | McDonald | Oct. 25, 1921 |
| 1,448,079 | Noeggerath | Mar. 13, 1923 |
| 1,448,080 | Noeggerath | Mar. 13, 1923 |
| 1,454,396 | McDonald | May 8, 1923 |
| 1,582,468 | Heald et al. | Apr. 27, 1926 |
| 1,641,300 | Spencer | Sept. 6, 1927 |
| 1,665,931 | Noeggerath | Apr. 10, 1928 |
| 1,672,561 | Ernst | June 5, 1928 |
| 1,690,069 | Ferris | Oct. 30, 1928 |
| 1,760,915 | Robson | June 3, 1930 |
| 1,843,082 | Ferris et al. | Jan. 26, 1932 |
| 1,848,006 | Ferris | Mar. 1, 1932 |
| 1,918,426 | Radnor | July 18, 1933 |
| 1,948,951 | Walker | Feb. 27, 1934 |
| 1,974,657 | Rodler | Sept. 25, 1934 |

FOREIGN PATENTS

| Number | Country | Date |
| --- | --- | --- |
| 173,043 | Great Britain | Dec. 16, 1921 |
| 174,984 | Great Britain | Feb. 6, 1922 |
| 97,928 | Switzerland | Feb. 16, 1923 |